S. G. RANDALL.
Hand Seeder.
No. 14,776.
Patented Apr. 29, 1856.
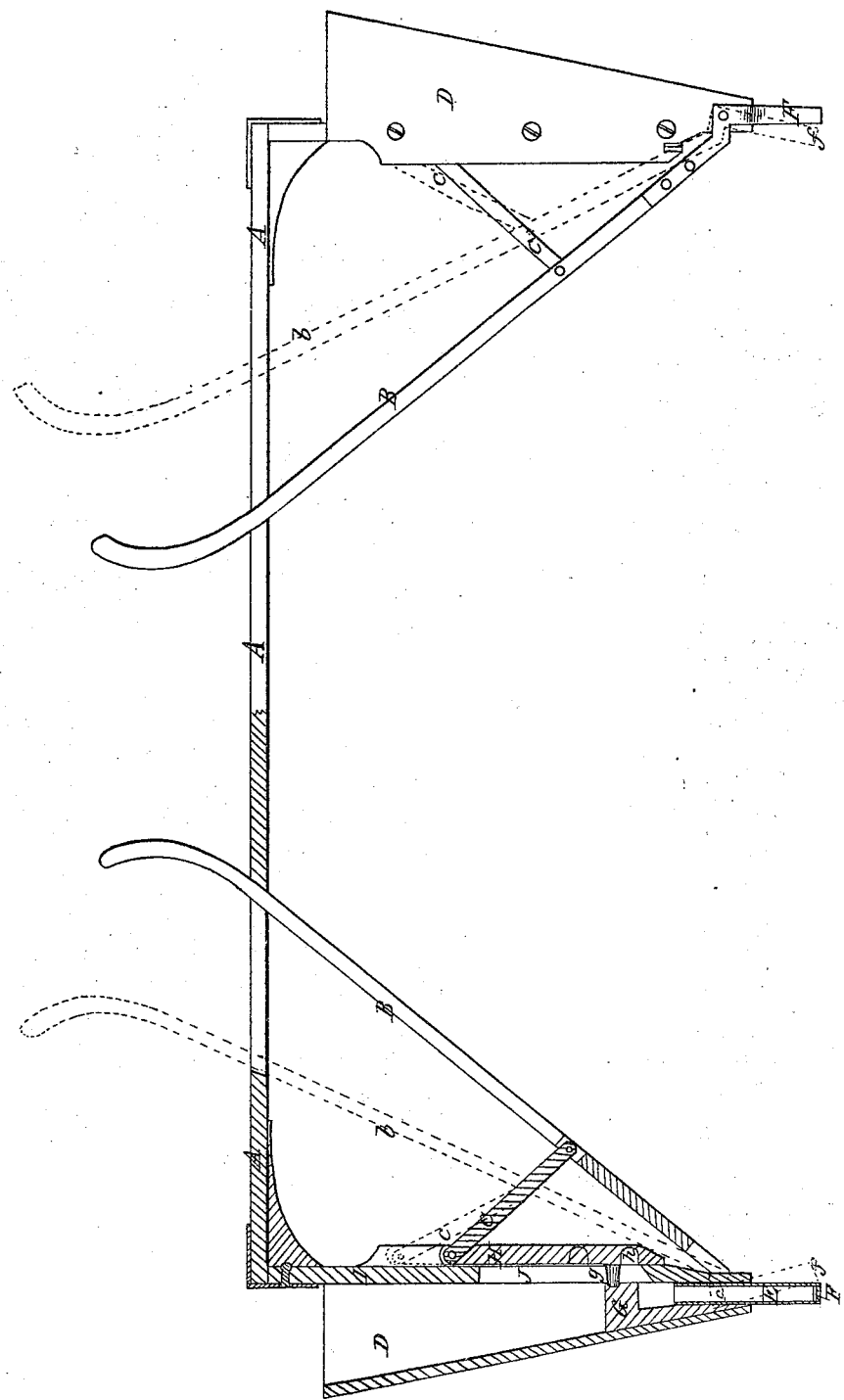

UNITED STATES PATENT OFFICE.

SILAS G. RANDALL, OF ROCKFORD, ILLINOIS.

IMPROVEMENT IN CORN-PLANTERS.

Specification forming part of Letters Patent No. 14,776, dated April 29, 1856.

*To all whom it may concern:*

Be it known that I, SILAS G. RANDALL, of Rockford, in the county of Winnebago and State of Illinois, have invented a new and useful Machine for Planting Corn; and I do hereby declare the following to be a full, clear, and exact description of the construction and operation of the same, reference being had to the annexed drawing, making a part of this specification, which is a front elevation, the left part being a transverse section of the same, the letters therein corresponding with the letters in this description.

A A A is the bar uniting the two like parts of the planter. B B $b$ $b$ are the levers; C C $c$ $c$, connecting-rods; D D, seed-boxes; E, (corresponding letters being supposed on the right half of the drawing,) the tubes; F F $ff$, the lids covering the mouth of the tubes; G, bottoms in the boxes; $g$, cut-off brushes in the bottoms; H, the vertical slides moving upon the sides I of the boxes, through which are slots J, through which slots seed pass into the measuring-cavities $h$.

The operation of the machine is thus: Being held by the levers, (which serve also as handles,) the machine is struck upon the ground, the lids covering the mouths of the tubes, and thus preventing the entrance of dirt into them while going into the soil. The levers are next moved toward the extremities of the bar, thus moving off or aside the lids from the mouths of the tubes and letting out the seed. This position is shown by the red lines in the drawing. The slides H are moved upward by the connecting-rods, and the measuring-cavities, being above the brushes, are filled with seed through the slots. The machine is now lifted from the ground, and while being carried forward the levers are returned to their first position, thus causing a descent of the slides by means of the connecting-rods, so that the seed in the cavities is discharged below the brushes into the tubes and falls upon the lids which were moved back upon the mouths of the tubes by the return of the levers. The machine is now ready for planting again.

I am aware of the arrangement of a pair of oblique spades meeting over the mouth of a movable tube; also of another arrangement having a little head in the center that draws up a collar which fills up the space between it and the tube, both working vertically in the tube. To have as little working apparatus exposed to the dirt as possible is extremely important. By a comparison the difference in this respect, and also in the number of parts, will be seen. In this device there is but one such part, and even its point of attachment is quite above the soil. Experience also shows that a broadside movement against the earth as deep as very much planting is required is very difficult for a hand-machine, and renders its use discouraging in all but light, sandy soils. By this device and the mode of applying it nothing but the edge of a thin steel plate is moved against the earth when the tube is opened. In entering the ground an edge is not required, as the whole momentum of the machine, acquired by its weight and the stroke, easily effects that result.

Having thus fully described the nature of my invention, what I claim therein as new, and desire to secure by Letters Patent, is—

The combining with the seed-tube E a cut-off valve, F, for closing or opening said tube, as the case may be, said valve moving edgewise against the soil when the passage is opened to allow the grains to pass into the ground, and operated from a lever, B, substantially in the manner and for the purpose set forth.

SILAS G. RANDALL.

In presence of—
ALBERT EBELING,
FREDERIC H. LARKIN.